United States Patent [19]
Rockland et al.

[11] 3,867,262
[45] Feb. 18, 1975

[54] PRODUCTION OF TERPENELESS ESSENTIAL OILS

[75] Inventors: Louis B. Rockland, Orinda; Charles R. Debenedict, Glendale, both of Calif.

[73] Assignee: The United States of America as represented by the Secretary of Agriculture, Washington, D.C.

[22] Filed: May 21, 1973

[21] Appl. No.: 362,620

[52] U.S. Cl. ............... 203/41, 203/39, 203/91, 260/236.6
[51] Int. Cl. .................... C07g 17/00, B01d 3/12
[58] Field of Search ............ 260/236.6; 203/41, 39, 203/91

[56] References Cited
UNITED STATES PATENTS

| | | | |
|---|---|---|---|
| 2,631,145 | 3/1953 | Othmer et al. | 260/236.6 |
| 2,712,008 | 6/1955 | Kirchner et al. | 260/236.6 |
| 2,975,170 | 3/1961 | Herrick et al. | 260/236.6 |
| 3,294,550 | 12/1966 | Ikeda et al. | 260/236.6 |
| 3,347,681 | 10/1967 | Platt | 260/236.6 |

OTHER PUBLICATIONS

Kirk–Othmer's Encyclopedia of Chemical Technology, 2d. ed., vol. 14 : 189–190 (1967).
The Essential Oils, Guenther (1948), D. Van Nostrand Co., vol. I : 218–226.

*Primary Examiner*—Henry R. Jiles
*Assistant Examiner*—S. D. Winters
*Attorney, Agent, or Firm*—M. Howard Silverstein; Max D. Hensley; William Takacs

[57] ABSTRACT

A terpeneless essential oil is obtained by a method which involves: (a) Molecularly distilling the crude oil to remove non-volatile materials; (b) adsorbing the volatile components on neutral alumina previously treated with ethyl acetate; and (c) securing essentially complete separation of terpenes from the desired oxygenated constituents by successive elution of the alumina with (i) a terpenophilic solvent (e.g., pentane) to remove the terpenes, and (ii) an oxygenated solvent (e.g., ethanol) to remove the oxygenated constituents which comprise the terpeneless essential oil.

5 Claims, No Drawings

PRODUCTION OF TERPENELESS ESSENTIAL OILS

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates to and has among its objects the provision of novel processes for preparing terpeneless essential oils. Further objects of the invention will be evident from the following description wherein parts and percentages are by weight unless otherwise specified. The expression "terpene" used herein is inclusive of sesquiterpenes.

Essential oils are widely used in perfumes, pharmaceuticals, toilet preparations, and in food products and beverages. The natural essential oils contain terpenes which, in general, oxidize readily when exposed to air with the development of unpleasant odors and flavors. In order to alleviate this difficulty, various procedures have been developed for separating the terpenes from the more desirable and more stable oxygenated constituents (mainly aldehydes, ketones, esters, and alcohols).

One of the known methods for accomplishing this end is disclosed by Kirchner and Miller in U.S. Pat. No. 2,712,008. Their process involves the following steps: The essential oil is adsorbed on a solid adsorbent such as silicic acid or alumina. The treated adsorbent is then eluted with a terpenophilic solvent such as hexane whereby terpenic constituents are removed. Next, the adsorbent is eluted with an oxygenated organic solvent such as ethyl acetate. The resulting eluate contains mainly the oxygenated constituents of the essential oil. By removal of the solvent from the resulting eluate there is obtained the desired product, the essential oil substantially free from terpenes.

One problem with the procedure outlined above is that the separation is not sufficiently sharp; some of the important oxygenated flavor components are eluted with the terpene components with the result that the end product is deficient in these flavor components.

A particular object of the invention is to remedy the problem outlined above. By application of the principles of the invention, one is enabled to attain a better separation of terpene and oxygenated constituents than heretofore attainable with the end result that the products of the invention contain more of the desired odor components of the original essential oil.

The process of the invention makes use of certain of the steps described in the aforesaid Kirchner and Miller patent, namely, adsorption of the essential oil on a solid adsorbent and successive elution with a terpenophilic solvent and an oxygenated solvent. However, to the basic process are added certain features which provide new and unexpected results.

One of the features of the invention is that the solid adsorbent is treated with ethyl acetate prior to the application of the essential oil thereto. This pre-treatment of the adsorbent causes what may be termed a preferential activation thereof. In other words, the pre-treatment alters, in a desirable direction, the relative affinity of the adsorbent for the terpenes and for the oxygenated components of the essential oil. The net result is that when the adsorbent (loaded with essential oil) is subjected to elution with a terpenophilic solvent, the terpene components are readily removed from the adsorbent and are accompanied with less of the oxygenated components than in the known procedure.

Another feature of the invention relates to the kind of adsorbent used. The Kirchner-Miller patent describes the use of various adsorbents such as silicic acid, alumina, magnesium oxide, etc. It has been found in accordance with the invention that the desirable effect of the pre-treatment described above is attained only where the adsorbent is neutral alumina. Other kinds of adsorbents, including silicic acid, acid aluminas, and alkaline aluminas, simply do not provide the desired result. The use of neutral alumina avoids certain deleterious rearrangements of the terpene hydrocarbons which occur when one uses such adsorbents as silicic acid, acid aluminas, or alkaline aluminas.

Still another feature of the invention lies in a purification of the essential oil prior to loading it on the adsorbent. In the Kirchner-Miller process the crude essential oil is directly applied to the adsorbent. This, we have found, produces unsatisfactory results as certain natural components of the oil interfere with the relative attractive forces of the terpene and oxygenated components with the adsorbent so that the desired sharp separation is not obtained. Accordingly, in the process of the invention, the essential oil is first subjected to a purification by vacuum molecular distillation. Other methods of vacuum distillation do not sufficiently remove these non-volatile natural components. In addition, useful and important flavor components are lost through decomposition when molecular distillation is not employed.

DETAILED DESCRIPTION OF THE INVENTION

The manner in which the aforesaid features are applied in a practice of the invention is next described in detail.

Purification of the Essential Oil.

The oil to be treated is subjected to vacuum molecular distillation, which provides a short path between the evaporating and condensing surfaces to avoid decomposition of the flavor components. In this distillation the distillate is collected for further use; the residue of waxes, coumarins, and other non-volatiles is discarded.

Preparation of the Adsorbent.

Neutral alumina is placed in a column or other receptacle and ethyl acetate is poured over it to thoroughly wet each particle of the alumina. The treated material is then drained and spread out on a surface and allowed to stand in air to evaporate the portion of ethyl acetate which is on the surface of the adsorbent particles. When these particles take on a dry appearance and are again pourable (as they were originally) the adsorbent is ready for use.

Application of the Essential Oil to the Adsorbent.

Usually, it is preferred to conduct the separation in a column or cylinder. The pre-treated adsorbent is placed in the column and the distilled essential oil is poured into the column. To ensure uniform application of the oil to the adsorbent particles, one may apply vacuum at the base of the column to draw the oil downwardly. Alternatively, pressure may be applied at the top of the column.

Elution of the Adsorbent.

After loading the adsorbent with the essential oil, the system is eluted with a terpenophilic solvent, such as pentane, in order to remove the terpenes. In conducting this elution, it is preferable to pass the selected solvent through the adsorbent column while taking small samples of the effluent liquid, and subjecting them to chromatographic or other analytical tests. By this means one can ascertain when the effluent contains the terpenes. The terpene-containing effluent can then be collected and saved for recovery of terpenes. By continuing the tests, the point at which the effluent no longer contains terpenes can also be determined. At this point, the collection of effluent is discontinued and the column is ready for elution of the oxygenated components. The total amount of terpenophilic solvent to be used will vary depending on such factors as the amount of adsorbent and amount of terpenes thereon. In any case, by application of the aforementioned tests on the effluent liquor, the proper amount of solvent can be determined for each particular case.

The terpenes can be recovered from the effluent by distillation. Vacuum distillation is preferred to minimize decomposition of the terpenes.

The expression "terpenophilic solvent" as used herein means an organic solvent which has a greater affinity for terpenes than the latter have for the adsorbent. As the terpenophilic solvent, we prefer to use pentane although many other liquids within this class give good results. For example, one may use carbon disulphide, carbon tetrachloride, benzene, hexane, and mixtures of hydrocarbons, such as gasoline, petroleum naphtha, petroleum ether, benzine, etc. Preferably, the terpenophilic solvent should have a boiling point below about 100° C. to facilitate its removal from the separated terpenes. For this reason pentane is preferred because it can be removed by very low temperature distillation without loss of terpene hydrocarbons.

Elution of the Oxygenated Constituents.

Following removal of the terpenes as described above, the adsorbent column is eluted with an oxygenated organic solvent, such as ethanol, ethyl acetate, ether, dioxane, acetone, or the like. Ethanol is preferred because it is non-toxic and metabolizable and, therefore, complete removal of this solvent from the essential oil is not critical. With the exception of the different solvent, this elution is carried out just as is the elution of the terpenes. As above noted, samples of the effluent are taken at frequent intervals to determine by chromatographic or other analytical tests the presence or absence of the essential oil in the effluent. By so doing the fraction of effluent containing the essential oil can be collected separately, thus to minimize the amount of solvent to be removed from the product. The total amount of solvent will vary depending on the amount of adsorbent material and the amount of nonterpenes in the essential oil. In general, by conducting the tests on the effluent liquors the proper amount of solvent to be used in any particular case can be determined.

The terpeneless essential oil can be recovered from the effluent solution by distillation preferably under high vacuum, at or below room temperature to prevent decomposition of the delicate oils.

In conducting the elutions we usually prefer to draw the eluting solvent through the column by application of vacuum to the bottom of the column. It is obvious, however, that pressure may be applied to the top of the column to obtain the same effect.

Although we prefer to conduct the adsorption and elutions on a column of the adsorbent material, such a technique is not critical. Thus the adsorbent may be slurried with the terpenophilic solvent and the distilled essential oil mixed therewith. This slurry is then centrifuged and the solvent removed. The adsorbent is then re-slurried with additional amounts of terpenophilic solvent, the solvent being removed each time by centrifuging. This is continued until essentially all the terpenes are eluted. The adsorbent is then slurried with the oxygenated organic solvent and the mixture centrifuged and the essential oil-solvent solution removed. It is further evident that instead of centrifuging, filtration can be used to isolate the adsorbent from either the terpenophilic solvent or oxygenated solvent eluates.

The terpeneless essential oils produced in accordance with the invention may be used for any of the purposes for which essential oils are employed, as in perfumes, pharmaceuticals, toilet preparations, food products, beverages, etc. Also, because of the clear-cut separation achieved by the process of the invention, the products are richer in desired flavoring or aromatic principles than known terpeneless oils, hence can be employed in smaller proportion to produce an equivalent level of aroma in the product to which they are added.

The invention may be applied to essential oils of all types, such as lemon oil, lime oil, orange oil, grapefruit oil, peppermint oil, spearmint oil, oil of bay, oil of bergamot, etc.

Terpeneless essential oils produced in accordance with the invention are much more stable than those obtained by other techniques. Terpene hydrocarbons yield undesirable compounds under the influence of heat and light. Since the essential oils of the invention are essentially free from such hydrocarbons, no impurities deleterious to the flavor and aroma of the oil can be formed.

Another advantage is that the terpeneless essential oils produced in accordance with the invention are compatible with aqueous preparations such as beverages and water-containing media used in preparing beverages and beverage syrups. For example, the terpeneless lemon oil of the invention is completely soluble in aqueous alcohol, without the formation of any cloud. Also, such alcoholic preparations disperse readily into clear solutions when diluted further with aqueous media used in beverage manufacture, and there is no formation of cloud or "ring" which normally forms in the neck of bottled beverages when flavored with whole or partially de-terpeneated oils.

Another advantage of the invention concerns the initial molecular distillation to remove non-volatile components of the crude oil. As a result, undesirable compounds, such as pesticides and the like, which are detrimental to the use of the essential oil, are eliminated at an early stage.

Since the essential oil of the invention is richer in flavor and aroma components, weight and bulk of the

EXAMPLE

The invention is further demonstrated by the following illustrative example.

A. Molecular Distillation to Separate Non-volatile Matter

Twenty-five ml. of commercial, raw, cold-pressed Desert-type lemon oil was molecularly distilled in a Kontes K-285600 falling film molecular still operated at 10 Torr during a 6-hour period. The volatile components were collected as follows: 35% in the distillate receiver and 65% in the Dry-ice trap between the high vacuum pump and the distillate receiver. These two fractions were combined (total volume 23.5 ml.) for use in Part C.

The distillation residue (0.9 g.) consisted largely of high boiling waxes, coumarins, and unidentified solids and contained only insignificant traces of volatile terpene hydrocarbons and oxygenated components.

B. Preparation of the Chromatographic Column

Chromatographic grade neutral alumina (60 g.) was added to 100 ml. of ethyl acetate and the mixture was stirred gently. The alumina was allowed to settle and excess ethyl acetate was removed by decantation. The remaining alumina-ethyl acetate slurry was dried in a shallow layer for 16 hours at 70° F., after which time the odor of the ethyl acetate was only barely perceptible. The airdried alumina was added to a Kontes Chromaflex No. 25 glass-jacketed chromatographic column containing commercial pentane, which had been cooled and held at 10° C. by circulating cold water through the outer column jacket. The alumina was allowed to settle evenly, aided by occasional gentle tapping of the column. Excess pentane was drained through the column until a "head" of one-sixteenth inch of pentane remained over the flat alumina surface at the top of the column.

C. Separation of Terpenes

The distillate from Part A (23.5 ml.) was carefully layered onto the surface of the alumina column prepared in Part B. The effluent stopcock was opened slightly and the distillate allowed to percolate into the alumina bed until level with the top of the alumina adsorbent. Commercial pentane was carefully added to the column without disturbing the surface layer. The effluent stopcock was opened and the pentane allowed to flow freely through the column. Approximately 115 ml. of effluent was obtained before a change in refraction occurred, indicating initial elution of the terpene hydrocarbons. The next 60 ml. of effluent contained all the terpenes. This eluate was collected and the terpenes were recovered by low-temperature distillation to remove the pentane. Analysis of this fraction indicated that essentially no oxygenated compounds were present.

D. Separation and Recovery of Oxygenated Components

The pentane head on the alumina column (from Part C) was allowed to recede to within one-sixteenth inch of the surface of the alumina and 120 ml. of absolute ethanol was placed carefully on the column. The first 45 ml. of eluate was essentially pure pentane that had occupied the liquid portion of the column prior to addition of the ethanol. A clear change in refraction of the eluate and the nearly concurrent emergence of a pale yellow band signaled the initial elution of the desired oxygenated components. About 75 ml. of ethanol was required to elute the fraction containing the oxygenated components. The eluate was collected and evaporated (to remove the ethanol) on a Buchi Rotavapor evaporator, yielding 0.6 ml. of terpeneless lemon oil.

A sample of the product was dissolved in ethanol and it was found that this solution was entirely miscible with water. Aqueous solutions of the ethanolic, terpeneless lemon oil retained their typical lemon flavor during storage in green-colored, Pyrex, screw-capped bottled (Teflon liners) at ambient temperature for at least one year without loss in flavor or development of off-flavor. In contrast, similar solutions of whole lemon oil developed off-flavors and odors within a few weeks.

Comparative Experiment 1

The procedure described in the above Example was repeated except that the lemon oil was not subjected to vacuum molecular distillation prior to placing it on the adsorbent. Examination of the terpene fraction by gas-liquid chromatography (glc) indicated the presence of substantial amounts of such oxygenated compounds as citronellyl, geranyl, and neryl acetates. On the other hand, the terpene fraction, obtained by first subjecting the crude oil to molecular distillation (as in Part A), did not contain these oxygenated compounds. This demonstrates the importance of molecularly distilling the crude oil as a preliminary step.

Comparative Experiment 2

The procedure described in the above Example was repeated except that the alumina was not pre-treated with ethyl acetate prior to its use on the column. The resulting product (the separated oxygenated components) was analyzed by glc and compared with the glc analysis of the corresponding product obtained in Part D of the Example. It was found that the product of the Example contained approximately 400% more of such oxygenated compounds as linalyl acetate, citronellol, nerol, geraniol, neral, terpineol-4, and α-terpineol than did the product of this comparative experiment.

Having thus described our invention, we claim:

1. A process for preparing a terpeneless essential oil, which comprises
   a. molecularly distilling the essential oil to separate the volatile fraction as the distillate from non-volatile components,
   b. adsorbing said distillate on neutral alumina which has been pre-treated with ethyl acetate,
   c. eluting the alumina with a terpenophilic solvent to remove the terpene constituents of the essential oil,
   d. eluting the alumina with an oxygenated organic solvent to remove the oxygenated constituents of the essential oil, and
   e. recovering a substantially terpeneless essential oil from the oxygenated organic solvent eluate.

2. The process of claim 1 wherein the essential oil is lemon oil.

3. The process of claim 1 wherein the terpenophilic solvent is pentane.

4. The process of claim 1 wherein the oxygenated organic solvent is ethanol.

5. A process for preparing terpeneless lemon oil, which comprises
   a. molecularly distilling lemon oil to separate the volatile fraction as the distillate from non-volatile components,
   b. adsorbing said distillate on neutral alumina which has been pre-treated with ethyl acetate,
   c. eluting the alumina with pentane to remove the terpene constituents of the lemon oil,
   d. eluting the alumina with ethanol to remove the oxygenated constituents of the lemon oil, and
   e. recovering a substantially terpeneless lemon oil from the ethanol eluate by evaporating the ethanol from said eluate.

* * * * *